United States Patent [19]

Brisson

[11] Patent Number: 5,678,052
[45] Date of Patent: Oct. 14, 1997

[54] METHODS AND SYSTEM FOR CONVERTING A TEXT-BASED GRAMMAR TO A COMPRESSED SYNTAX DIAGRAM

[75] Inventor: James Paul Brisson, Boca Raton, Fla.

[73] Assignee: International Business Machines Corporation, Armonk, N.Y.

[21] Appl. No.: 375,526

[22] Filed: Jan. 19, 1995

[51] Int. Cl.[6] .................................................. G06F 17/30
[52] U.S. Cl. .................... 395/754; 395/702; 395/922; 395/612; 364/274.1; 364/274.3
[58] Field of Search ..................................... 395/700, 600, 395/759, 754, 922, 702, 612, 200.03; 364/419.08, 280.4, 274.1, 274.3

[56] References Cited

U.S. PATENT DOCUMENTS

| | | | |
|---|---|---|---|
| 4,989,145 | 1/1991 | Kyushima | 364/419.08 |
| 5,437,038 | 7/1995 | Silberbauer | 395/700 |
| 5,493,678 | 2/1996 | Arcuri | 395/600 |
| 5,526,522 | 6/1996 | Takeuchi | 395/700 |

OTHER PUBLICATIONS

Delaplain, B.J., "Recursive Syntax Processing," IBM Technical Disclosure Bulletin, vol. 25, No. 11A, Apr. 1983.

Author Unknown, "Multiple Annotation Classes," IBM Technical Disclosure Bulletin, vol. 28, No. 5, Oct. 1985.

Singh, H.S., "Generalized Protocol Boundary Syntax For End User And Application Interfaces," IBM Technical Disclosure Bulletin, vol. 29, No. 5, Oct. 1986.

Author Unknown, "Syntax Diagram Generator," IBM Technical Disclosure Bulletin, vol. 30, No. 9, Feb. 1988.

Hidalgo, D.S., "Language Processing Language Syntax Production Definition," IBM Technical Disclosure Bulletin, vol. 35, No. 4A, Sep. 1992.

Hidalgo, D.S., "Language Processing Language Parser Goals Definition," IBM Technical Disclosure Bulletin, vol. 35, No. 4A, Sep. 1992.

Hidalgo, D.S., "Language Processing Language Character Class Support," IBM Technical Disclosure Bulletin, vol. 35, No. 4A, Sep. 1992.

Jacobs, D.C., et al., "Controlled Rollback For Structured Query Language," IBM Technical Disclosure Bulletin, vol. 35, No. 5, Oct. 1992.

Loricchio, D.F., "Preference And Performance Differences For Three Syntax Diagrams," *Designing and Using Human--Computer Interfaces and Knowledge Based Systems*, Elsevier Science Publishers, Amsterdam, 1989, pp. 173–178.

Armstron, J., et al., "The VHDL Validation Suite", *27th ACM/IEEE Design Automation Conference*, Paper 1.1, 1990, pp. 2–7.

Snyder, R.M., "Specifying Textual to Graphical Conversion," *The Journal of Systems and Software*, vol. 16, No. 1, Sep. 1991, pp. 17–28.

Braz, L.M., "Visual Syntax Diagrams for Programming Language Statements," ACM, 1990, pp. 23–27.

*Primary Examiner*—Jeffery Hofsass
*Assistant Examiner*—Albert K. Wong
*Attorney, Agent, or Firm*—Heslin & Rothenberg, P.C.

[57] ABSTRACT

Methods and a system for converting a BNF grammar to a compressed railroad diagram are set forth. For a selected grammar rule within the text-based grammar, a space required within the compressed railroad diagram is determined. Thereafter, a space required is added to a total space required for the compressed railroad diagram. If the selected grammar rule includes a non-terminal symbol, then a grammar rule within the text-based grammar which defines the non-terminal symbol is used as the selected grammar rule, and the method is repeated provided that the total space required does not exceed a predetermined space available for the compressed railroad diagram. The compressed railroad diagram is generated based upon each selected grammar rule.

18 Claims, 11 Drawing Sheets

```
001  <SESLIST>      = STRLIST = ( <STRUCT0> ) ;
002  <STRUCT0>      = <STRUCT> <STRUCT1> ;
003  <STRUCT1>      = , <STRUCT2> <STRUCT1> ;
004                 = ;
005  <STRUCT2>      = <STRUCT> ;
006                 = <STROPT> ;
007                 = <STRRANGE> ;
008  <STRUCT>       = STRNAME = NAME ;
009  <STROPT>       = <CONNME> ;
010                 = <ACCTIME> ;
011  <CONNME>       = CONNME = NAME ;
012  <ACCTIME>      = ACCESSTIME = <ACCTIME1> ;
013  <ACCTIME1>     = ENFORCE ;
014                 = NOLIMIT ;
015  <STRRANGE>     = LOCKENTRIES ;
016                 = USERCNTLS;
017                 = ( <STRRANGEP> <RNGOPTADS> ) ;
018  <STRRANGEP>    = COCLASS = <LIST> <CA> <CA> ;
019                 = STGCLASS = <LIST> <CA> <CA> ;
020                 = LISTNUM = <LIST> <CA> <CA> ;
021  <LIST>         = ALL;
022                 = ( <ELEMENTS> ) ;
023                 = <ELEMENT>;
024  <ELEMENTS>     = <ELEMENT> <ELEMENTS1> ;
025  <ELEMENTS1>    = , <ELEMENTS> ;
026                 = ;
027  <ELEMENT>      = NUMBER <ELEMENT1> ;
028  <ELEMENT1>     = - NUMBER ;
029                 = ;
030  <RNGOPTADS>    = , <RNGOPTADS1> ;
031                 = ;
032  <RNGOPTADS1>   = <ADJNCT> <RNGOPTDAT> ;
033                 = <EDAT> <RNGOPTADJ> ;
034                 = SUMMARY ;
035  <RNGOPTDAT>    = , <EDAT> ;
036                 = ;
037  <RNGOPTADJ>    = , <ADJNCT> ;
038                 = ;
038  <ADJNCT>       = ADJUNCT = <ADJNCT1> ;
040  <ADJNCT1>      = CAPTURE ;
041                 = DIRECTIO ;
042  <EDAT>         = ENTRYDATA = <EDAT1> ;
043  <EDAT1>        = SERIALIZE ;
044                 = UNSERIALIZE ;
045  <CA>           = ;
```

*fig. 5*

```
>>──────STRLIST──=──(─┤STRUCTO├─)──────><
```

ACCTIME:
```
├── ACCESSTIME ──=──┤ACCTIME1├──────────────┤
```

ACCTIME1:
```
├──┬─ENFORCE─┬──────────────────────────────┤
   └─NOLIMIT─┘
```

ADJNCT:
```
├── ADJUNCT ──=──┤ADJNCT1├──────────────────┤
```

ADJNCT1:
```
├──┬─CAPTURE──┬─────────────────────────────┤
   └─DIRECTIO─┘
```

CA:
```
├───────────────────────────────────────────┤
```

CONNME:
```
├── CONNAME ──=── NAME ─────────────────────┤
```

EDAT:
```
├── ENTRYDATA ──=── EDAT1 ──────────────────┤
```

EDAT1:
```
├──┬─SERIALIZE───┬──────────────────────────┤
   └─UNSERIALIZE─┘
```

ELEMENT:
```
├──┤NUMBER├──┤ELEMENT1├─────────────────────┤
```

ELEMENTS:
```
├──┤ELEMENT├──┤ELEMENTS1├───────────────────┤
```

ELEMENTS1:
```
├──┬─────────────────┬──────────────────────┤
   └─,──┤ELEMENTS├───┘
```

*fig. 6A*

METHODS AND SYSTEM FOR CONVERTING A TEXT-BASED GRAMMAR TO A COMPRESSED SYNTAX DIAGRAM

TECHNICAL FIELD

This invention relates in general to techniques for representing a grammar of a computer language. More particularly, the invention relates to techniques for creating a compressed syntax diagram from a text-based grammar input.

BACKGROUND OF THE INVENTION

Computer languages remain one of the fundamental methods of communications between a computer and a user. As examples, programming languages allow a user to direct the computer to execute a sequence of operations, and command languages allow a user to initiate computer operations from an on-line interface. Thus, the proper understanding of the syntax of computer languages by a user is of continued importance.

The syntax of computer languages can be represented in various formats to facilitate understanding of the language syntax by a user. One type of format is a text-based grammar, which includes various symbols and characters that represent different aspects of the subject computer language. Although a computer user can learn to understand text-based grammars, years of experience are needed to become expert in the reading thereof. By way of example, Backus-Naur Forms ("BNF") is a common text-based grammar (see, for example, FIG. 5).

An important aspect of text-based grammars such as BNF is their application to parse code generators. To briefly explain, programs known as parse code generators accept a text-based grammar and generate computer program code based thereon which parses an input for conformance with the text-based grammar. This code is typically used in compilers and command interpreters and, for example, is responsible for the all too familiar "unrecognized command" message. Advantageously, by using the same text-based grammar for user documentation and parse code generation, both the syntax documented to the user (albeit difficult to understand) and the actual syntax implemented will be identical.

An alternative to text-based grammars is a graphical representation of a grammar. For example, syntax diagrams represent computer languages by means of graphically interconnected symbols and operators. Such a graphical representation is widely believed to be easier to learn, easier to understand, and more effective in communicating the represented computer language syntax. An example of a syntax diagram type is an uncompressed railroad ("RR") diagram (see, for example, FIGS. 6A–C).

It is often desirable to convert a text-based grammar to a syntax diagram (for example, BNF to RR diagram(s)). Thus, a BNF grammar is preserved for use by parse generators while corresponding RR diagrams are available for users. Manually performing this conversion is error prone, slow and tedious. Automating such a conversion facilitates a reduction in errors and an increase in conversion speed as compared to manual conversion.

As of this date, automated BNF to RR diagram conversion has been limited to the production of uncompressed RR diagrams. To explain, BNF grammars have multiple rules contained therewithin, and associated RR diagrams have traditionally contained separate syntax diagram fragments per rule. This made reading such uncompressed RR diagrams difficult. A user had to skip between fragments to fully understand the syntax shown. Thus, although somewhat easier to read than BNF, uncompressed RR diagrams fail to optimize graphical syntax representations.

Compressed RR diagrams have as many BNF rules as possible consolidated into each syntax diagram fragment. This vastly improves readability of the syntax diagram and understanding of the grammar represented thereby. However, as of this date, no method of automatically converting BNF to a compressed RR diagram is known to exist.

The present invention is directed towards providing solutions for the above noted problems.

DISCLOSURE OF THE INVENTION

Briefly described, in a first aspect, the present invention comprises a method for converting a text-based grammar to a compressed syntax diagram using a programmed computer having a memory and an output means. The text-based grammar has a plurality of grammar rules contained therein, and has at least one non-terminal symbol defined by one of the grammar rules.

Specifically, the method includes determining for a selected grammar rule within the text-based grammar, a space required within the compressed syntax diagram therefor. The space required by the selected grammar rule is accumulated within a total space required which is stored in the memory of the programmed computer. If the selected grammar rule includes a non-terminal symbol, then a grammar rule within the text-based grammar which defines the non-terminal symbol is used as the selected grammar rule and the method is repeated provided that the total space required does not exceed a predetermined space available on the output means for the compressed syntax diagram. The compressed syntax diagram is generated based upon each selected grammar rule.

As an enhancement, the generating step may include generating a plurality of instructions which define the syntax diagram, and generating the syntax diagram therefrom. Further, the plurality of instructions may be generated by sequential assembly during each repeating step within the method.

Further methods and system in accordance with the present invention are set forth.

To summarize, the techniques of the present invention have numerous advantageous and features associated therewith. The automatic generation of compressed syntax diagrams from BNF source text facilitates the reliable use of the same BNF source text for both parse code generation as well as user documentation. This guarantees consistency between the parser implemented in the computer language and the documentation to the users instructing them on the language syntax. Previously, generating compressed RR diagrams was a manually laborious and error prone process. However, the techniques of the present invention facilitate widespread use of compressed RR diagrams by making their generation automatic and accurate.

In further regard to user documentation, compressed RR diagrams have significant advantages over uncompressed RR diagrams. Particularly, compressed RR diagrams better convey the syntax represented thereby because the reader does not have to mentally combine multiple syntax fragments as in uncompressed RR diagrams.

Thus, the techniques of the present invention contribute to higher quality computer language documentation in both printed and displayed forms. This inevitably makes learning and using the subject computer languages easier. Therefore the present invention facilitates a wholesale improvement in the field of man to machine interaction with regard to computer use.

BRIEF DESCRIPTION OF THE DRAWINGS

The subject matter which is regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIG. 5 is a diagram showing a sample BNF grammar used in an embodiment of the present invention;

FIGS. 6A-C are diagrams showing multiple syntax fragments of an uncompressed RR diagram of the BNF grammar of FIG. 5 according to an embodiment of the present invention.

BEST MODE FOR CARRYING OUT THE INVENTION

The techniques of the present invention convert a text-based grammar to a syntax diagram. More specifically, the techniques are described with respect to a text-based grammar comprising BNF and a syntax diagram comprising a compressed railroad diagram. However, these disclosed techniques may also be applied to other text-based grammars and syntax diagrams as will be apparent to one of ordinary skill in the art.

Definitions

Prior to describing the techniques of present invention in detail, several terms used therein are defined below:

Grammar Rule—an expression which defines relationships within a grammar between symbols and operators. See, for example, the grammar rules shown in FIG. 5.

Non-Terminal Symbol—a symbol of a grammar rule that is further defined by an additional grammar rule. All non-terminal symbols must be 'expanded' using the defining grammar rule in order to fully understand the represented grammar.

Terminal Symbol—a symbol which requires no further definition/expansion. This is actual text which is part of the grammar being described.

Syntax Fragment—a portion of a railroad diagram. Typically, multiple syntax fragments are separated vertically on a page. See, for example, FIGS. 6A-C.

Figure 6B:
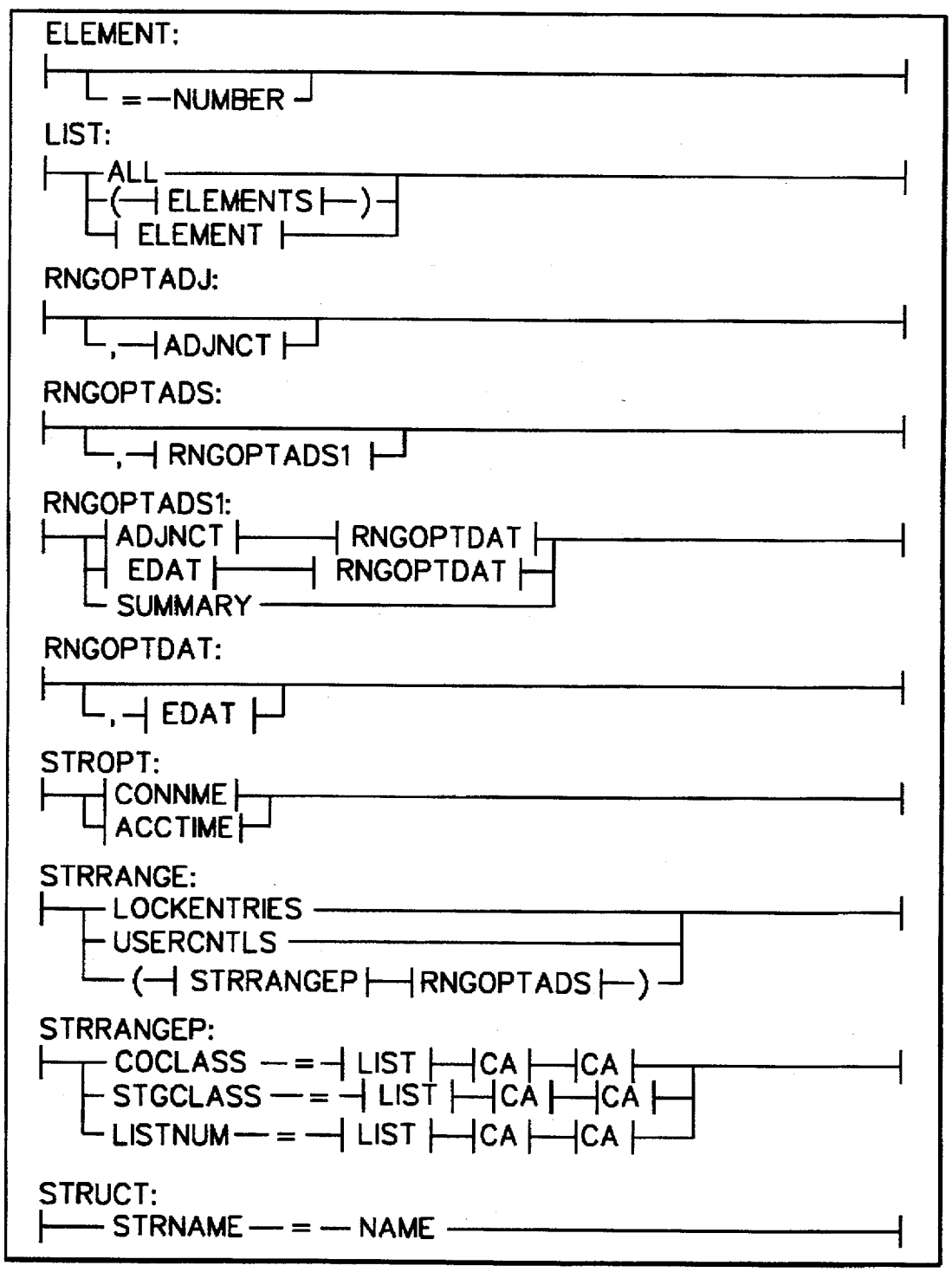
Figure 6C:
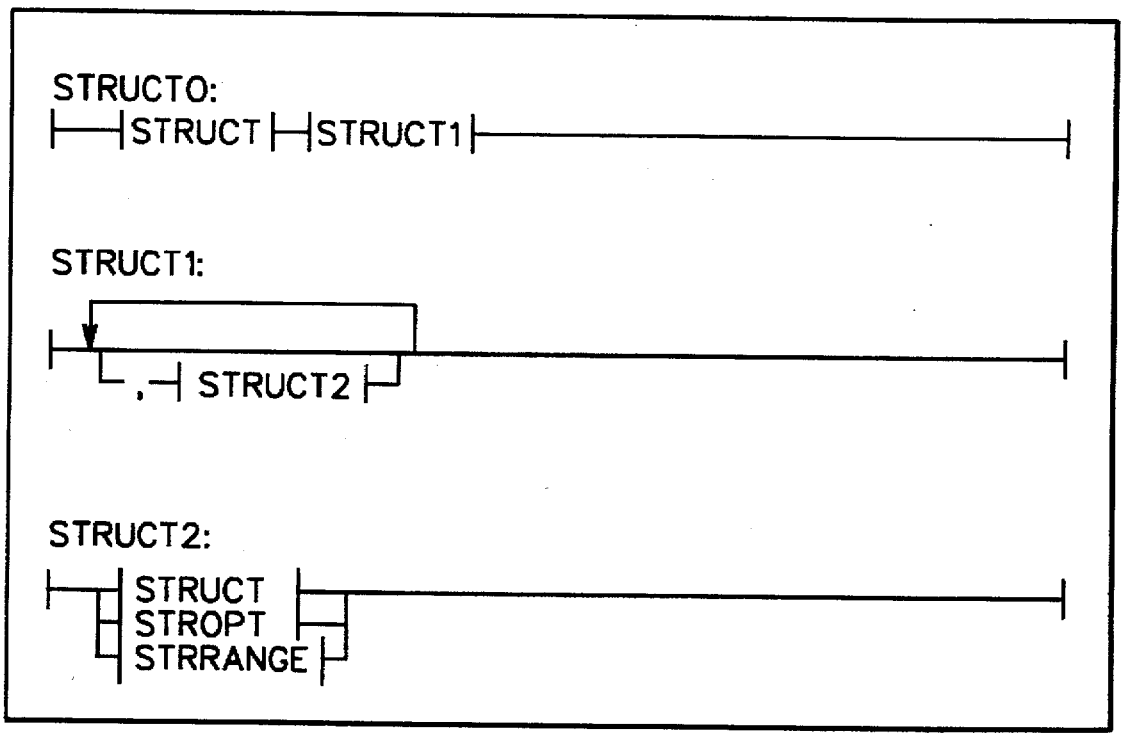

Uncompressed Railroad diagram—a railroad diagram in which each grammar rule is associated with its own syntax fragment within the RR diagram. More specifically, there is a 1 to 1 correspondence of non-terminals to syntax fragments (FIGS. 6A-C).

Figure 7:
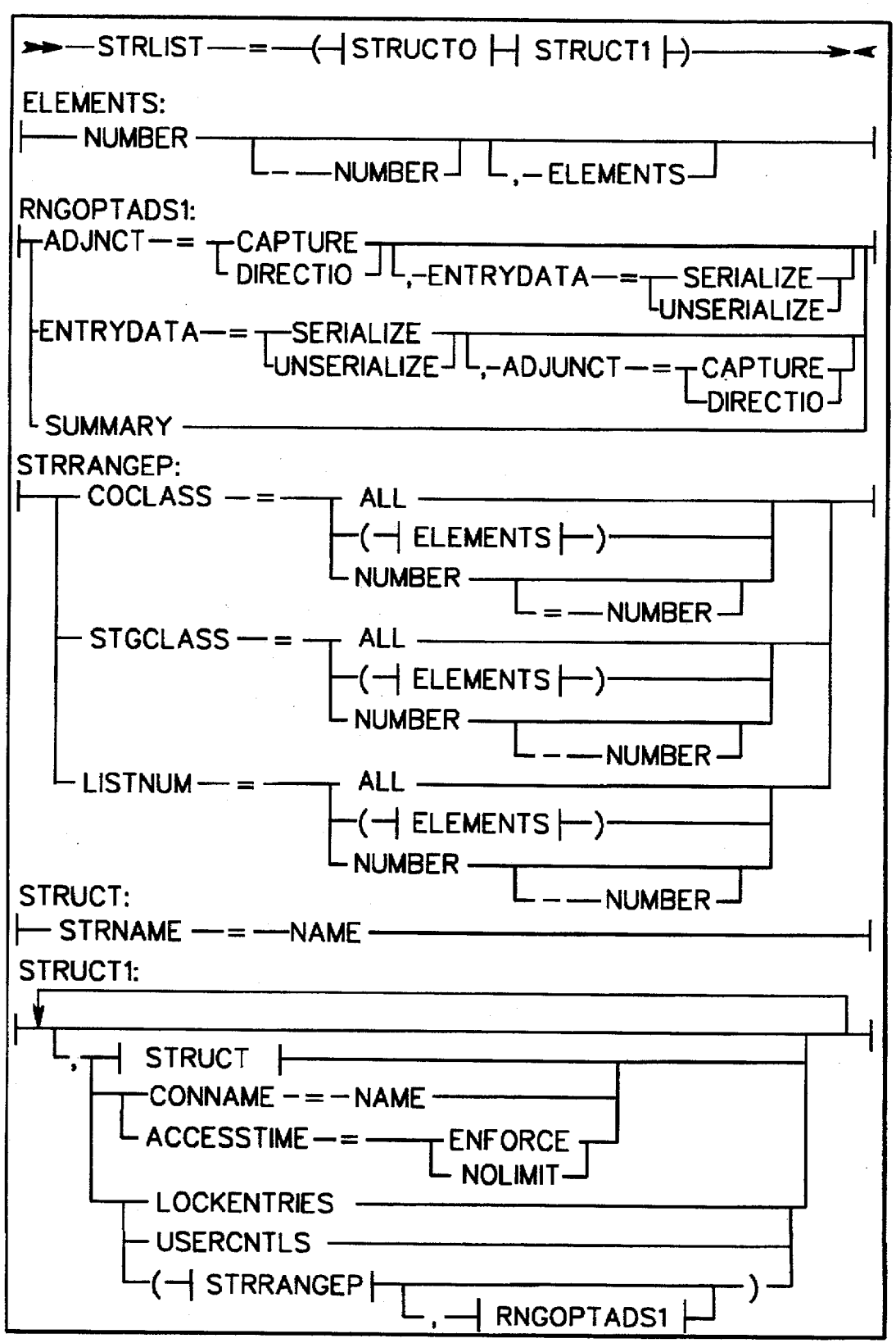
FIG. 7 is a diagram showing multiple syntax fragments of a compressed RR diagram of the BNF grammar of FIG. 5 in conformance with one embodiment of the present invention.

Compressed Railroad diagram—a railroad diagram in which grammar rules for multiple non-terminals have been consolidated into the syntax fragments of the RR diagram. More specifically, there is greater than a 1 to 1 correspondence of non-terminals to syntax fragments (FIG. 7).

An example of a BNF grammar for a command from IBM's MVS Operating System is shown in FIG. 5. BNF is a conventional grammar used widely in the computer arts and should be readily understood by one of ordinary skill therein. Nonetheless, a basic description of BNF notation may be found in "Compiler Design Theory" by Lewis, Rosenkrantz and Sterns, published by Addison Wesley and hereby incorporated herein by reference.

In specific regard to the MVS command shown in FIG. 5, many grammar rules compose the command. Most of these grammar rules include non-terminal symbols. Therefore, expansion of the non-terminal symbols using their definition (contained in other grammar rules) is necessary in order to completely understand the command being described. Moreover, since the grammar rules that define the non-terminal symbols may themselves contain non-terminal symbols, further expansion and substitution is necessary to fully expand a command defined using BNF. As an example, the symbol 'STROPT' is defined in terms of non-terminal symbols 'CONNME' and 'ACCTIME' which both require additional expansion as they both contain other non-terminal symbols.

As of this date, automated techniques exist for the conversion of BNF to RR diagrams, but such techniques are limited to the generation of uncompressed RR diagrams. To illustrate, the text-based grammar of FIG. 5 is shown as an uncompressed RR diagram in FIGS. 6A-C. Each grammar rule from the BNF (FIG. 5) corresponds to a separate syntax fragment within the uncompressed RR diagram. As with BNF, these uncompressed diagrams require significant effort on the readers part to 'expand' each non-terminal symbol. In the case of BNF, such expansion involves reading further text-based grammar rules, while in the case of uncompressed RR diagrams, such expansion involves reading further syntax fragments. Thus, uncompressed RR diagrams fail to convey language syntax in an efficient and consolidated manner.

In accordance with the techniques of the present invention, a compressed RR syntax diagram of the BNF of FIG. 5 is shown in FIG. 7. To briefly summarize, various non-terminal symbols have been replaced using their respective grammar rules in an effort to consolidate as many grammar rules as possible from the BNF into each syntax fragment within the compressed RR diagram. Readability is increased due to the consolidation of multiple grammar rules into each syntax fragment. Thus, manual traversal of multiple syntax fragments as in uncompressed RR diagrams is unnecessary.

It should be noted that multiple syntax fragments still exist in the compressed RR diagram of FIG. 7 due to space limitations on the page. Specifically, additional fragments are established when further 'expansion' would result in the syntax fragment running off of the side, or bottom of the page. A feature of the present invention facilitates the generation of a compressed RR diagram which includes automatically creating multiple syntax fragments when space limitations have been reached.

Figure 1:
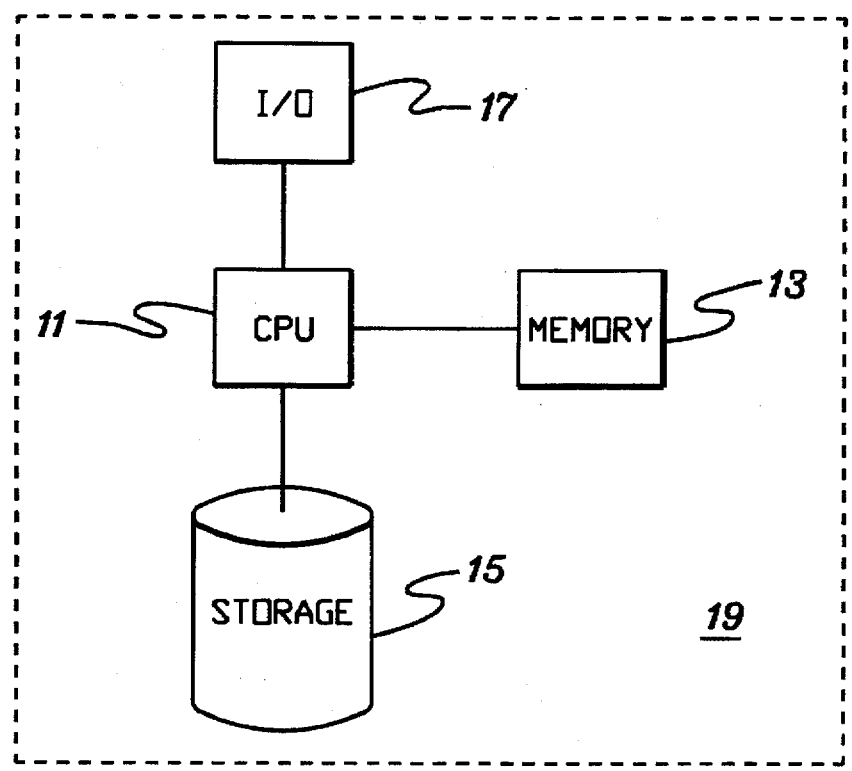
FIG. 1 is a block diagram of a computer system for performing the techniques of the present invention according to one embodiment thereof.

The techniques of the present invention may be implemented using conventional computer technology. For example, a typical computer system is shown in FIG. 1. The computer system (19) includes central processing unit ("CPU") (11), input/output ("I/O") (17), memory (13) and storage (15). The BNF grammar and RR diagrams may be input/output through I/O (17) during conversion/processing by CPU (11), and they may be stored in memory (13) or in storage (15). The conversion/processing is performed by the computer system (19) according to a program. Thus, when programmed, the computer constitutes an apparatus for converting BNF to compressed RR diagrams. Any processing system with the capabilities described hereinabove or equivalent may be used to implement the techniques of the present invention.

The techniques of the present invention include the determination of how many grammar rules may be consolidated into a particular syntax fragment of a compressed RR diagram without exceeding the space boundaries on a page (or equivalent thereof, such as a window on a computer screen). The techniques described herein merge multiple grammar rules into a consolidated grammar rule which will produce a single syntax fragment that is guaranteed to fit on a page. This consolidated grammar rule may be passed as it is being generated to a routine which converts it to a compressed RR diagram syntax fragment. If one consolidated rule comprises the entire syntax, then a complete compressed RR diagram is generated, and not only a syntax fragment. As an example, a conventional conversion routine is described in "SYNTAX DIAGRAM GENERATOR," IBM TECHNICAL DISCLOSURE BULLETIN, Vol. 30, No. 9, February 1988 and hereby incorporated herein by reference.

A method of the present invention for converting BNF to a compressed RR diagram is described in detail below with reference to the flow diagrams of FIGS. 2–4D. Each individual step of the method may be performed using conventional computer programming techniques which will be apparent to one of ordinary skill in the art.

Figure 2:
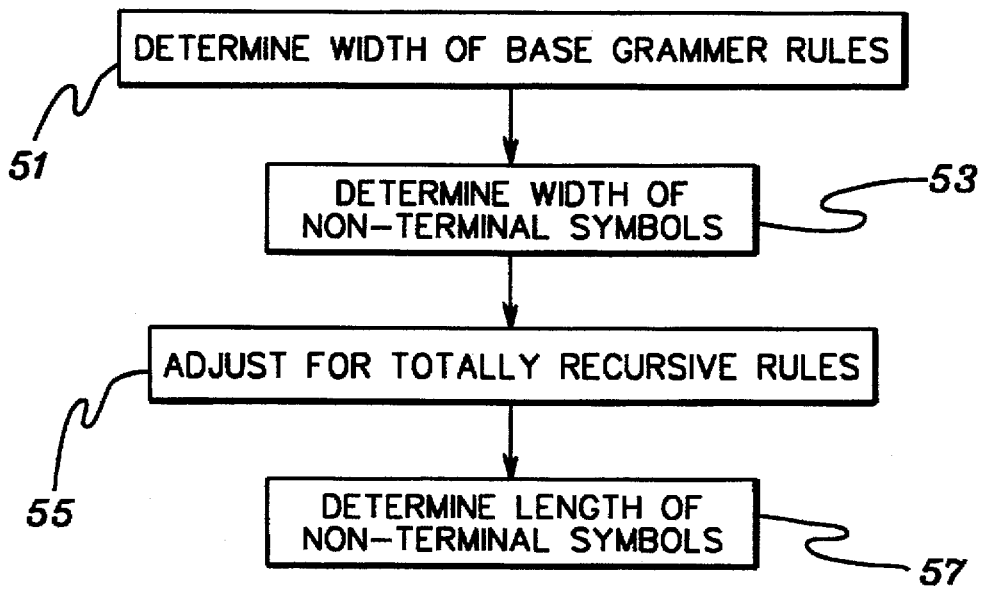
FIG. 2 is a flow diagram of initial preparatory steps for converting a BNF grammar to a compressed RR diagram in accordance with one embodiment of the present invention.

The steps of an initial preparation phase for converting a BNF source to a compressed RR diagram are shown in FIG. 2. An initial step involves determining the width of each of the base grammar rules within the BNF source (51). Specifically, this step determines the width of the base grammar rule(s) which define a command or statement; for example, 'STRLIST' of FIG. 5, (i.e. not the rules defining the non-terminal symbols). When determining this width, the non-terminal symbols are not expanded, their width is considered that of their symbol names. In a similar regard, the widths of the non-terminal symbols as expressed by their respective grammar rules within the BNF source are determined (53). Again, any non-terminal symbols contained within the grammar rule(s) are not expanded, only the width of the symbol is used. The length of any rule is ordinarily counted as a single line unless modified as discussed hereinbelow.

An adjustment is next made to the above determined width(s) and length(s) if a rule is totally recursive (55). Specifically, both horizontal and vertical room is added for the back-arrow, and the width of the self-referencing symbol (contained twice in the BNF, but only depicted once in the RR diagram) is subtracted. The length of the non-terminal symbols is next calculated (57) (i.e., vertical space occupied on a page or screen). In particular, the number of alternative grammar rules (i.e. OR's) corresponding to the non-terminal symbol are counted, and one line per each is allocated. Further, if all of the alternative grammar rules are recursive, then an additional line must be added for the back-arrow. This determined length and width information is stored in a table within the memory of the programmed computer.

Subsequent to the initial preparation phase, a main routine (FIG. 3) is executed. A first step therein is the marking of the start symbol as "MUST_INCLUDE" (61). This forces a syntax fragment to be created for the start symbol as described further hereinbelow. As a general note, the first symbol in a BNF source is typically the start symbol, for example, "SESLIST" of FIG. 5.

A next part of the process of the main routine includes looping through all non-terminal symbols, and calling the recursive routine whenever a symbol marked "MUST_INCLUDE" is encountered. The recursive routine will then write a syntax fragment starting with that symbol. It should be generally noted that the recursive routine may mark other symbols as "MUST_INCLUDE" if they will not fit in the space allocated. This is how multiple syntax fragments are generated. Since the start symbol has been marked "MUST_INCLUDE" as described hereinabove, the recursive routine will be called and a syntax fragment will be written beginning with the start symbol.

Figure 3:
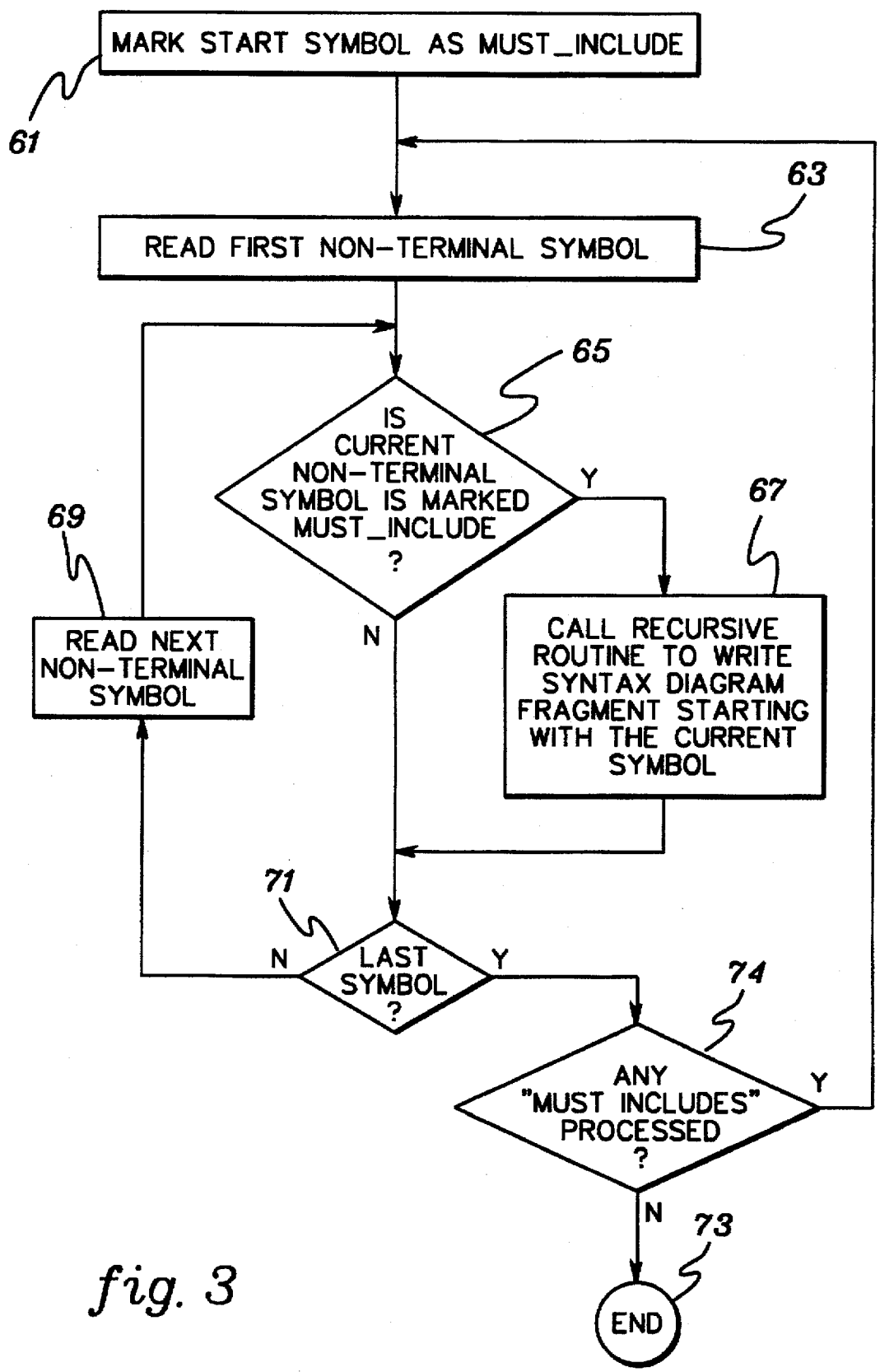
FIG. 3 is a flow diagram of a main routine for converting a BNF grammar to a compressed RR diagram pursuant to an embodiment of the present invention.

By way of further explanation with regard to the flow diagram of FIG. 3, a first non-terminal symbol of the BNF is read (63) (the start symbol). A test is then performed on this symbol to determine if it is marked "MUST_INCLUDE" (65). If so marked, the recursive routine is called upon to write a syntax fragment starting with the current symbol (67). After the recursive routine has been called or if the current symbol is not marked "MUST_INCLUDE," a test is performed to check if the current symbol is the last symbol of the BNF (71). If not, the next non-terminal symbol is read (69) and the method is repeated. If the current symbol is the last symbol of the BNF, a test is performed to check if there were any "MUST_INCLUDEs" processed (74) in the preceding loop. If there were "MUST_INCLUDEs" processed, the loop is restarted with the first non-terminal symbol (63). If there were no "MUST_INCLUDEs" processed then the routine ends (73).

As described hereinabove, a recursive routine is called from the main routine to generate a syntax fragment starting with a given non-terminal symbol. Generally described, the recursive routine proceeds recursively down the parse tree of BNF grammar rule expansion while there is room on the page (or screen) for the grammar rule currently being diagrammed.

The recursive routine must maintain certain information in the programmed computer's memory such that a determination may be made as to when to include an "expanded" symbol in a syntax fragment. This information is maintained as local variables to the recursive routine as described below:

THIS_LHS—This is the cost of (space consumed by) the left-hand side of the rule as viewed from the current position within the rule.

INH_LHS—This is the cost of the left-hand side ("LHS") of the rule inherited from the previous level of recurion. The INH_LHS excludes the LHS cost of the current rule.

THIS_RHS—This is the cost of the right-hand side of the rule as viewed from the current position within the rule. More specifically, this is the cost of the remainder of the current rule assuming that no more non-terminal symbols will be expanded.

INH_RHS—This is the cost of the right-hand side ("RHS") of the rule inherited from the previous level of recurion. This represents the minimum (no more non-terminal symbols expanded) cost for the rest of the syntax fragment (i.e. parse tree) that remains unexplored.

THIS_LEN—This is the length of the current non-terminal symbol. It may be calculated by adding the length of the rules for the non-terminal symbol. Specifically, the length of a rule is the maximum length (i.e., number of lines) in any one of its symbols.

INH_LEN—This is the length of the current rule inherited from the previous level of recursion. the INH_LEN excludes the length of the current non-terminal symbol.

When the recursive routine calls upon itself (i.e. recursively), it passes down the following information:

RHS—This is passed down and becomes the INH_RHS of the called recursive routine. RHS=INH_RHS+THIS_RHS of the calling routine.

LHS—This is passed down and becomes the INH_LHS of the called recursive routine. LHS=INH_LEN+THIS_LEN of the calling routine.

LEN—This is passed down and becomes the INH_LEN of the called recursive routine. LEN=INH_LEN+THIS LEN of the calling routine.

Upon return from the recursive routine, the following information is passed up:

GREATEST_LHS and GREATEST_LEN—These are the LHS and length, respectively, corresponding to the maximum expansion that occurred in subsequent recursions (i.e. lower levels of the parse tree). They are maintained for comparison to a predetermined space available for the syntax fragment. This enables detection of when the syntax fragment has reached the predetermined space available on the page or other output media.

COST_INLINE—This is the length cost of inlining the current rule, and is passed up the parse tree.

The functioning of the recursive routine for conforming to a maximum width available is further described below with regard to the flow diagram of FIGS. 4A–B. As first steps, the values of THIS_RHS and THIS_LHS are initialized. Specifically, THIS_RHS is set to the width of the current rule (75) (without expanding non-terminal symbols contained therein) and THIS_LHS is set to zero (77). The current symbol is then tested (79) to determine if it is non-terminal and if:

(the width cost of expanding the current nonterminal symbol inline)+THIS_LHS'INH_LHS+INH_RHS+THIS_RHS<= (allowed width)

If the test is true, then adequate space exists for expansion of the non-terminal symbol. Accordingly, THIS_LHS is assigned the value of THIS_LHS+INH_LHS (81). Further, THIS_RHS is assigned the value of THIS_RHS+INH_RHS—the width of the non-terminal symbol (83). The recursive routine is then called to process the current non-terminal symbol so that it is included in the current syntax fragment (85). Thus, an "expansion" of a non-terminal symbol has been performed with all variables updated accordingly.

After return from the call to the recursive routine, THIS_LHS is assigned the value of THIS_LHS—INH_LHS (87) and THIS_RHS is assigned the value of THIS_RHS—INH_RHS (89). This subtracts the width of the non-terminal symbol just expanded from the right-hand and left-hand side costs. The width of the non-terminal symbol itself is not needed because it has been replaced by the grammar rule defining it (i.e., "expansion").

Referring back to test 79, if the result of the test is false, then either the current symbol is terminal and can not be expanded, or the current symbol is non-terminal and expansion thereof would exceed the space available. As an adjustment, the value of THIS_LHS is increased by the width of the current symbol (91) and the value of THIS_RHS is decreased by the width of the current symbol (93). This facilitates left to right traversal through the grammar rule. Specifically, the current position is moved one symbol to the right.

Regardless of the outcome of test 79, at this point in the process a further test is performed. Specifically, If THIS_LHS is greater than the longest rule for the current symbol (95—FIG. 4B) then GREATEST_LHS is assigned the value of THIS_LHS (97). Thus, the maximum width encountered as the parse tree is traversed is preserved.

Subsequent to the execution of test 95, LHS is assigned the value of GREATEST_LHS to facilitate passing back up through the parse tree (i.e. levels of recursion) the GREATEST_LHS value (99). This, of course, facilitates the determination of whether the syntax fragment has grown too large to fit in the predetermined maximum space available therefore as discussed hereinabove. Lastly, the recursive routine returns control to the calling routine (101).

Figure 4A:
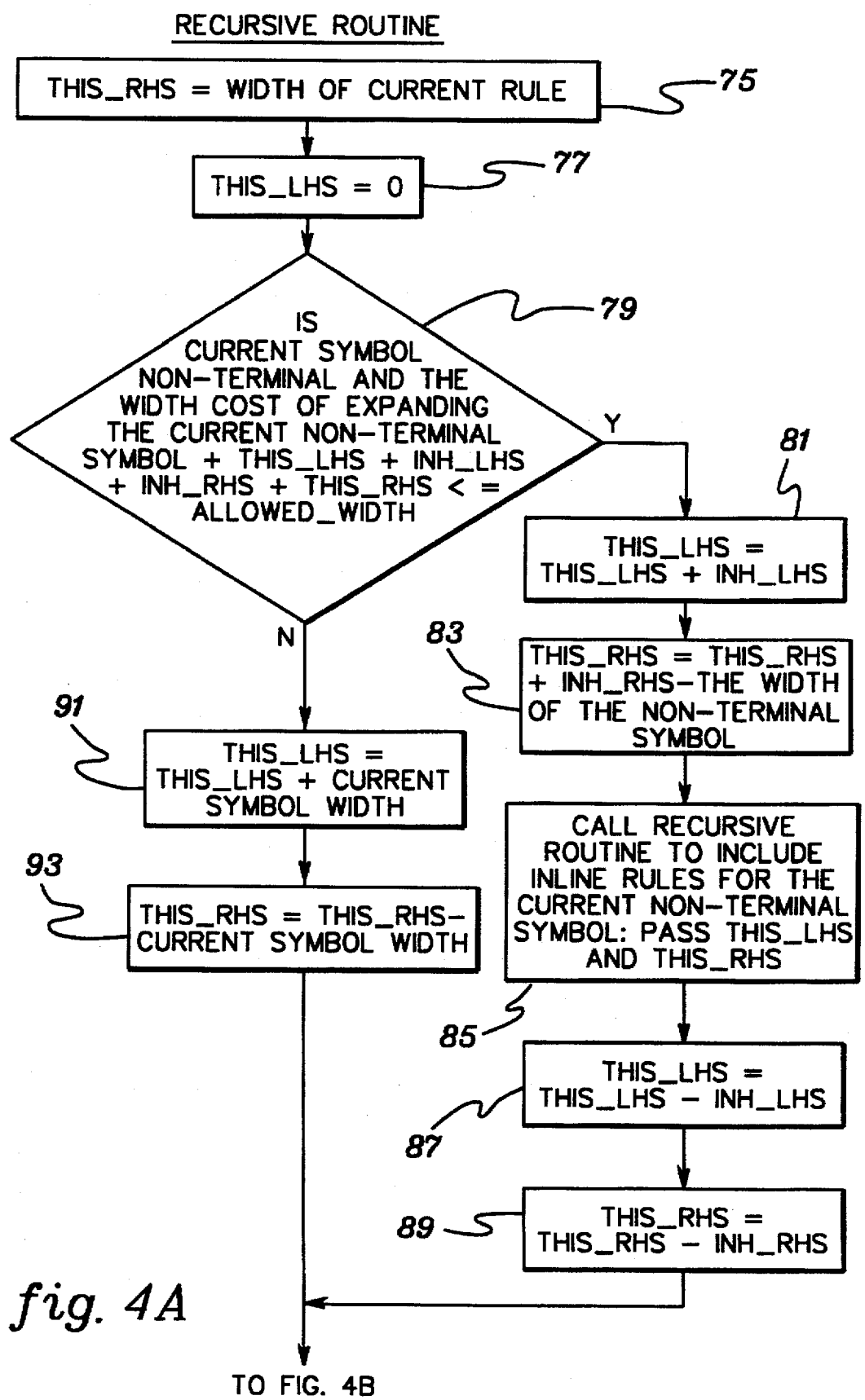
FIGS. 4A-B are flow diagrams of a recursive routine used to convert a BNF grammar to a compressed RR diagram in accordance with one embodiment of the present invention.
Figure 4B:
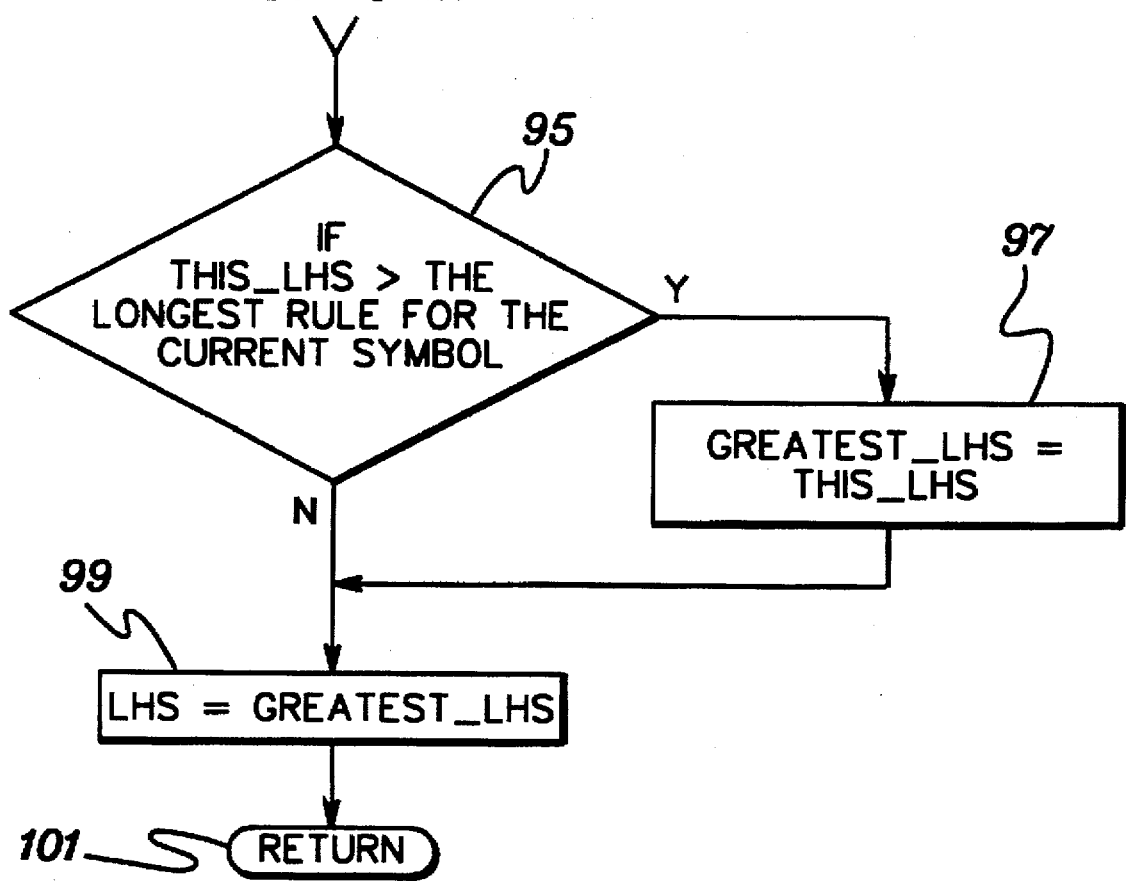
Figure 4C:
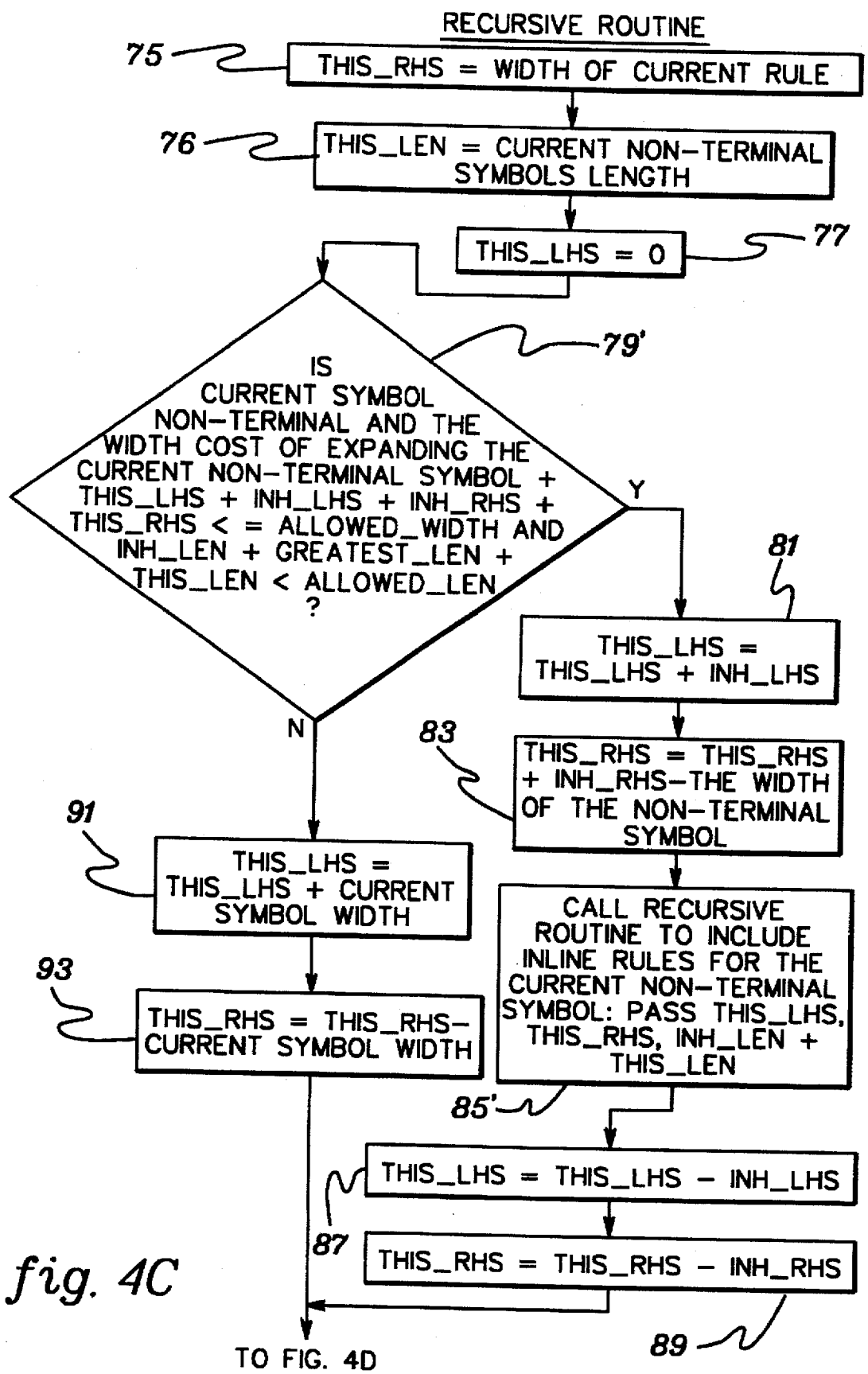
FIGS. 4C-D are flow diagrams of the recursive routine of FIGS. 4A-B with additional steps included for enforcing an allowed length for the compressed RR diagram pursuant to an embodiment of the present invention.
Figure 4D:
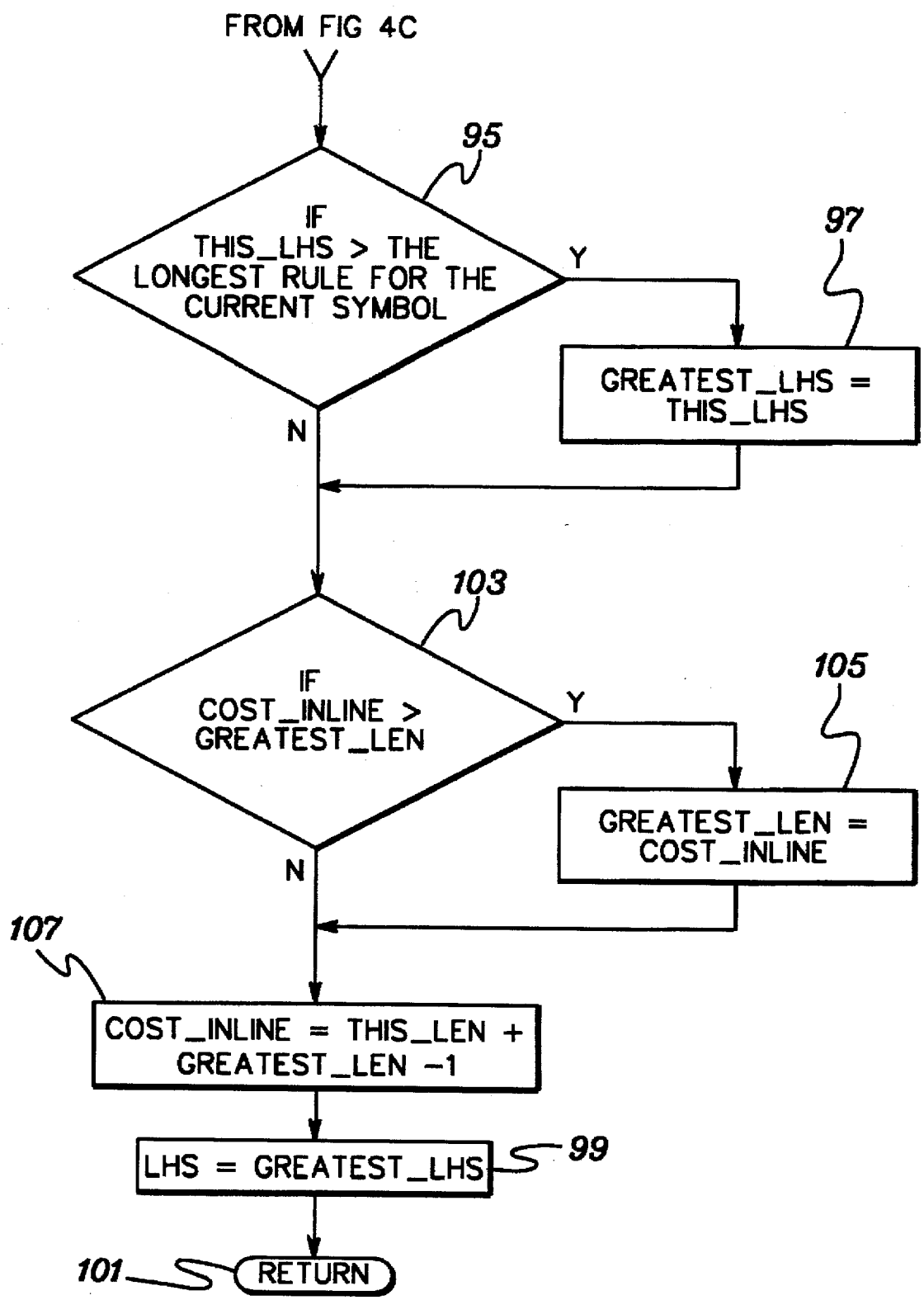

The method shown in the flow diagram of FIGS. 4A–B may be modified to insure that the compressed RR diagram conforms to a predetermined length available as well as a predetermined width available. Such a method is shown in FIGS. 4C–D and described hereinbelow with respect to the changed and additional steps.

A beginning step includes the initialization of THIS_LEN to the length of the current nonterminal symbol (76). As discussed previously, this includes counting the lines occupied by symbol (the "ORs"), and adding any necessary space for a backarrow if the rule is totally recursive. However, a single non-terminal symbol may require more lines than are available. New non-terminal symbols may be created to handle such a situation. For example, the length limit may be four for the following grammar, but the following rule exists:

<a>=u;
<a>=v;
<a>=w;
<a>=x;
<a>=y;
<a>=z;

Creating rule <b> as follows, solves the problem by dividing the one "long" rule into two shorter rules:

<a>=u;
<a>=v;
<a>=w;
<a>=<b>;
<b>=x;
<b>=y;
<b>=z;

Implementing such a technique will be apparent to one of ordinary skill in the art.

To continue, the conditional step 79' includes a length check in addition to the previous width check. Specifically, a test is performed to check whether:

INH_LEN+GREATEST_LEN+THIS_LEN<ALLOWED_LEN

Only if neither the allowed width nor length are exceeded is the recursive routine called and the rule inlined. Upon calling the recursive routine (85'), INH_LEN+THIS_LEN is passed as the INH_LEN of the called routine.

Prior to returning from the recursive routine, a test is performed to check whether the length cost for inlining the current symbol is greater than the GREATEST_LEN (103—FIG. 4C). If so, the GREATEST_LEN is assigned the value of the cost of inlining the current symbol (105). Regardless of the outcome of the test (103), the cost of inlining the current rule is assigned the value of THIS_LEN+GREATEST_LEN−1 (107) such that it may be passed back from the recursive routine.

The above described method determines the grammar rules (i.e. expanded non-terminal symbols) that may be included in a given RR diagram, or syntax fragment thereof. Again, the RR diagram will be separated into multiple syntax fragments if necessary to fit properly on a page, or a computer display screen. The actual generation of the syntax diagram is performed via well known routines previously applied to a single rule. Since the above described techniques of the present invention guarantee that the fragment comprising multiple grammar rules (i.e. a base rule and substitutions for non-terminal symbols) will fit in the space allocated, previous routines can be provided with all non-terminal symbol substitutions for a given syntax fragment. Specifically, the processing to form a syntax diagram may be performed by passing expanded non-terminal symbol information to the conventional routine as each non-terminal symbol is processed. Thus, the compressed RR diagram is created piece by piece.

The conventional RR diagram generating routine may provide various forms of output for creating the actual compressed RR diagram. A first category of output comprises printed output. The conventional routine may generate printed output by directly generating the printer specific codes corresponding to the compressed RR diagram. Alternatively, the conventional routine may generate a sequence of instructions for a post-processor that attaches to the printer. An example of such a sequence of instructions would be IBM's BOOKMASTER text markup language.

The conventional routine may alternatively produce compressed RR diagrams on the screen of a computer or in a window on a computer screen. As with printed output, the conventional routine may directly access the screen of the computer, or produce a sequence of graphics instructions to generate the displayed RR diagram. An example of a display 'language' for a series of graphic instructions could comprise the Graphical Programming Interface ("GPI") of IBM's OS/2 operating system.

The techniques of the present invention have numerous advantageous associated therewith. The automatic generation of compressed syntax diagrams from BNF source text facilitates the reliable use of the same BNF source text for both parse code generation as well as user documentation. This guarantees consistency between the parser implemented in the computer language and the documentation to the users instructing them on how to input commands to the system. Previously, generating compressed RR diagrams was a manually laborious and error prone process. However, the techniques of the present invention facilitates widespread use of compressed RR diagrams by making their generation automatic and accurate.

In further regard to user documentation, compressed RR diagrams have significant advantages over uncompressed RR diagrams. Particularly, compressed RR diagrams better convey the syntax represented thereby because the reader does not have to mentally combine multiple syntax fragments as in uncompressed RR diagrams.

Further, the techniques of the present invention are applicable to both printed and displayed computer output. Thus, the compressed RR diagrams may be printed in a manual, or displayed on a computer screen as, for example, on-line help and/or documentation. In fact, the same BNF source text may be used in conjunction with the present invention to provide both in an automatic and accurate manner.

Thus, the techniques of the present invention contribute to higher quality computer language documentation in both printed and displayed forms. This inevitably makes learning and using the subject computer languages easier. Therefore the present invention facilitates a wholesale improvement in the field of man to machine interaction with regard to computer use.

While the invention has been described in detail herein, in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A method for converting a text-based grammar to a compressed syntax diagram using a programmed computer having a memory and an output means, said text-based grammar having a plurality of grammar rules therein and having at least one non-terminal symbol defined by a grammar rule of said plurality of grammar rules, said compressed syntax diagram having a syntax fragment, said method comprising the steps of:

(a) determining for a selected grammar rule of the plurality of grammar rules within said text-based grammar, a space required within said syntax fragment of said compressed syntax diagram for said selected grammar rule;

(b) accumulating a total space required within said syntax fragment by adding thereto said space required from said step (a), and storing said total space required in said memory of said programmed computer;

(c) if said selected grammar rule of said step (a) includes a non-terminal symbol, using as said selected grammar rule a grammar rule within said text-based grammar which defines said non-terminal symbol and repeating said steps (a), (b) and (c), said repeating being performed provided said total space required does not exceed a predetermined space available on said output means for said syntax fragment of said compressed syntax diagram, said predetermined space being sufficient for at least two grammar rules of said plurality of grammar rules to be accommodated within said syntax fragment of said compressed syntax diagram; and (d) establishing said compressed syntax diagram based upon each selected grammar rule of said step (a), wherein said syntax fragment of said compressed syntax diagram contains data representative of multiple grammar rules of said plurality of grammar rules.

2. The method of claim 1, wherein said establishing step (d) comprises generating a plurality of instructions which define said syntax diagram and generating said syntax diagram using said plurality of instructions.

3. The method of claim 2, wherein said establishing step (d) comprises generating said plurality of instructions after said steps (a), (b) and (c) have been completed.

4. The method of claim 2, wherein said establishing step (d) comprises generating said plurality of instructions by sequentially assembling said plurality of instructions during each repeating step of said step (c).

5. The method of claim 1, wherein said programmed computer includes a recursive subroutine, said recursive subroutine performing said steps (a), (b) and (c).

6. The method of claim 5, wherein said computer includes a plurality of variables stored in said memory of the computer, said method further including passing to said recursive subroutine through said plurality of variables an inherited left-hand cost and an inherited right-hand cost of a previously selected grammar rule for facilitating said determining step (a) and said accumulating step (b).

7. The method of claim 6, wherein said method further includes passing to said recursive subroutine through said plurality of variables an inherited length of a previously selected grammar rule for facilitating said determining step (a) and said accumulating step (b).

8. The method of claim 7, wherein said method further includes passing back from said recursive routine, to a calling routine, through a GREATEST_LHS variable of said plurality of variables, a greatest left-hand side value which includes the greatest cost of expanding a non-terminal symbol within said selected grammar rule for facilitating said accumulating step (b).

9. The method of claim 8, wherein said method further includes passing back from said recursive routine, to a calling routine, through a GREATEST_LEN variable of said plurality of variables, a greatest length which includes a greatest length cost of expanding a non-terminal symbol within said selected grammar rule for facilitating said accumulating step (b).

10. The method of claim 1, wherein said determining step (a) further includes determining a width of each non-terminal symbol within said selected grammar rule, said space required within said syntax diagram for said selected grammar rule including said width of each non-terminal symbol within said selected grammar rule.

11. The method of claim 10, wherein said determining step (a) further includes determining a length of each non-terminal symbol within said selected grammar rule, said space required within said syntax diagram for said selected grammar rule including said length of each non-terminal symbol within said selected grammar rule.

12. The method of claim 1, wherein said programmed computer includes a table within the memory thereof, said method further including the step of storing, within said table, a space required within said syntax diagram for each grammar rule within said text-based grammar, and wherein said determining step (a) comprises retrieving said space required within said syntax diagram for said selected grammar rule from said table within the memory of the computer.

13. The method of claim 1, wherein said selected grammar rule comprises multiple non-terminal symbols, and wherein said step (c) comprises for each non-terminal symbol of said multiple non-terminal symbols using a grammar rule which defines the non-terminal symbol as said selected grammar rule and repeating said steps (a), (b) and (c) for each non-terminal symbol.

14. The method of claim 1, further including generating a plurality of instructions based upon said selected grammar rules of said step (a), said establishing step (d) comprising establishing said compressed syntax diagram on a computer output device based upon said plurality of instructions.

15. The method of claim 14, wherein said plurality of instructions comprises a text markup language, said establishing step (d) including processing said text markup language through a text processor such that said compressed syntax diagram comprises a printed compressed syntax diagram.

16. The method of claim 14, wherein said plurality of instructions comprises a plurality of graphics instructions, said establishing step (d) including processing said plurality of graphics instructions through a graphics processor such that said compressed syntax diagram comprises a displayed compressed syntax diagram.

17. A system for producing a compressed syntax diagram from a text-based grammar input, said text-based grammar input comprising a first plurality of grammar rules, said compressed syntax diagram comprising a computer generated output, said system comprising:

a programmed computer having an output means; and means for determining, using said programmed computer, a second plurality of grammar rules comprising at least a subset of said first plurality of grammar rules, said second plurality of grammar rules defining a syntax diagram fragment, said syntax diagram fragment having a size no greater than a predetermined size within said computer generated output, wherein multiple grammar rules of said first plurality of grammar rules are accommodated within said syntax diagram fragment.

18. The system of claim 17, wherein said computer generated output comprises at least one of a printed output, a display output, and an output file.

* * * * *